United States Patent
Murry

(10) Patent No.: US 6,629,428 B1
(45) Date of Patent: Oct. 7, 2003

(54) METHOD OF HEATING FOR AN AIRCRAFT ELECTRIC ENVIRONMENTAL CONTROL SYSTEM

(75) Inventor: Roger P. Murry, San Pedro, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/266,504

(22) Filed: Oct. 7, 2002

(51) Int. Cl.$^7$ ............................................. F25D 9/00
(52) U.S. Cl. ............................................. 62/401
(58) Field of Search ............................. 62/86, 87, 88, 62/401, 402, 172

(56) References Cited

U.S. PATENT DOCUMENTS

| | | | | |
|---|---|---|---|---|
| 4,263,786 A | * | 4/1981 | Eng ............................. 62/87 |
| 4,434,624 A | | 3/1984 | Cronin et al. | |
| 4,462,561 A | | 7/1984 | Cronin | |
| 4,487,034 A | | 12/1984 | Cronin et al. | |
| 4,503,666 A | * | 3/1985 | Christoff ............... 60/39.07 |
| 4,523,517 A | * | 6/1985 | Cronin ........................ 98/1.5 |
| 4,535,606 A | * | 8/1985 | Rannenberg .............. 62/402 |
| 4,546,939 A | | 10/1985 | Cronin | |
| 4,966,005 A | | 10/1990 | Cowell et al. | |
| 5,442,905 A | * | 8/1995 | Claeys et al. ........... 60/39.07 |
| 5,709,103 A | * | 1/1998 | Williams .................. 62/402 |
| 5,860,283 A | | 1/1999 | Coleman et al. | |
| 5,899,085 A | * | 5/1999 | Williams .................. 62/236 |
| 5,918,472 A | | 7/1999 | Jonqueres | |

\* cited by examiner

Primary Examiner—Denise L. Esquivel
Assistant Examiner—Malik N. Drake
(74) Attorney, Agent, or Firm—William J. Zak, Jr., Esq.

(57) ABSTRACT

An aircraft environmental control system (ECS) provides fresh air for the cabin of an aircraft by using electric motor driven compressors in place of traditional engine bleed air. Conventional aircraft ECS use an engine bleed to provide the pressurized fresh air flow for an aircraft cabin. However, such a system suffers from the disadvantage of requiring additional fuel consumption in order to provide an adequate engine bleed source. The present invention, using a zero bleed, electric powered architecture, does not suffer from this drawback of the conventional ECS.

27 Claims, 3 Drawing Sheets

METHOD OF HEATING FOR AN AIRCRAFT ELECTRIC ENVIRONMENTAL CONTROL SYSTEM

BACKGROUND OF THE INVENTION

The present invention generally relates to an aircraft environmental control system (ECS). More specifically, the present invention relates to an ECS where the fresh air for the cabin is provided by electric motor driven compressors in place of traditional engine bleed air.

Modern jet airplanes operate in a physical environment that is not survivable by unprotected humans. Thus, these airplanes contain a complex ECS to enable survival, safety and comfort for the aircraft passengers.

Referring to FIG. 1, there is shown a bleed system of a conventional aircraft with a Pratt & Whitney (P&W) 4000 engine. As outside air enters the compressor stages 100 of the engine, it is compressed to about 32 psi and a temperature of about 330° F. Some of this air is then extracted from the engine core through either a high pressure bleed port 110 or a low pressure bleed port 120, depending upon the pressure requirements at any given time. A shut-off valve 130 adjusts the feed from high pressure bleed port 110 depending on aircraft systems requirements.

The bleed air passes through a precooler 140 to help regulate the temperature and pressure of the bleed air delivered to meet the pneumatic services of the airplane, such as water pressurization, wing and engine anti-ice protection, hydraulic pumps, trim air for cabin warming, and the like.

The precooled air for the conventional ECS travels through air conditioning packs (not shown) to provide essentially dry, sterile, and dust free conditioned air to the airplane cabin. This conditioned air is then mixed with a predetermined amount of cabin recirculated air and delivered to the aircraft cabin. Trim air, taken downstream of precooler 140, may be added to warm the conditioned air to a suitably comfortable level for the aircraft cabin.

At the beginning of the commercial jet airliner age, jet airplanes did not have cabin air recirculation systems. The primary reason was that early jets were powered by highly inefficient turbojet engines. In the turbojet, all of the air entering the engine went through the core. Thrust was obtained by extremely high velocity, high energy turbine exhaust. Fuel consumption was very high, but the additional fuel required to provide outside air to the cabin was very small because the bleed air extraction was a small percentage of the total core airflow.

As engine technology progressed, turbofans were developed with a core bypass ratio of approximately 2 to 1. That is, only about one-half of the air drawn into the engine enters the core. The bulk of the air goes through the bypass portion of the engine to produce most of the engine thrust. Fuel economy improved and the cost of engine bleed air relative to overall fuel consumption was still sufficiently small to make 100% bleed air to the passenger cabin cost effective. The economics at that time were also affected by shorter average flight lengths and a lower percentage of direct operating costs attributed to fuel than today.

As modern turbofan engines with high 5 to 1 bypass ratios were developed, fuel consumption to provide engine thrust decreased. However, the fuel consumption relative to extracting bleed air dramatically increased, almost in direct proportion to the higher bypass ratio. For a 767 aircraft with P&W 4000 engines, the percent increase in fuel consumption due to bleed air only would be almost four times higher than an equivalently sized turbojet. With rising fuel costs and the development of more efficient engines, this relative increase in fuel consumption for bleed air becomes quite significant.

As can be seen, there is a need for an improved ECS which overcomes the disadvantages of the conventional ECS systems as discussed above.

SUMMARY OF THE INVENTION

In one aspect of the present invention, an environmental control system for providing conditioned air to a substantially enclosed space, comprises at least one air compressor for pressurizing fresh air from outside the space to provide pressurized fresh air; at least one vapor cycle pack for conditioning the pressurized fresh air from the at least one air compressor to provide conditioned air; and an air distribution system for delivering the conditioned air to the space.

In another aspect of the present invention, an environmental control system for providing conditioned air to a substantially enclosed space comprises at least one air compressor for pressurizing fresh air from outside the space to provide pressurized fresh air; the at least one electric air compressor providing heat to warm the fresh air without the requirement of a resistance heating element; at least one vapor cycle pack for conditioning the pressurized fresh air from the at least one air compressor to provide conditioned air; an air distribution system for delivering the conditioned air to the space; a recirculation add heat valve to recirculate air from an output of the compressor back into an input of the compressor; an air fan for recirculating air from the space into the pressurized fresh air prior to passing through the at least one vapor cycle pack; and a precooler for cooling the pressurized fresh air prior to entry into the at least one vapor cycle pack.

In a further aspect of the present invention, an environmental control system for an aircraft to provide a flow of conditioned air within at least a cabin portion of the aircraft comprises at least one cabin air compressor for pressurizing fresh air from outside of the aircraft to provide pressurized fresh air; at least one vapor cycle packs for conditioning the pressurized fresh air from the plurality of cabin air compressors to provide conditioned air; and an air distribution system for delivering the conditioned air to a cabin of the aircraft.

In yet a further aspect of the present invention, an environmental control system for an aircraft to provide a flow of conditioned air within at least a cabin portion of the aircraft comprises at least one cabin air compressor for pressurizing fresh air from outside of the aircraft to provide pressurized fresh air; at least one vapor cycle pack for conditioning the pressurized fresh air from the at least one cabin air compressor to provide conditioned air; an air distribution system for delivering the conditioned air to a cabin of the aircraft; a recirculation add heat valve to recirculate air from an output of the cabin air compressor back into an input of the cabin air compressor; a cabin air fan for recirculating air from the cabin into the pressurized fresh air prior to passing through the at least one vapor cycle pack; and a precooler for cooling the pressurized fresh air prior to entry into the at least one vapor cycle pack.

In a still further aspect of the present invention, a method for supplying conditioned air to at least a cabin area of an aircraft comprises pressurizing fresh air from outside the aircraft with at least one cabin air compressor to provide pressurized fresh air; conditioning the pressurized fresh air with at least one vapor cycle pack to provide conditioned air; and distributing the conditioned air to the cabin area of the aircraft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides an aircraft environmental control system (ECS) where the fresh air for the cabin is provided by electric motor driven compressors in place of traditional engine bleed air.

Conventional aircraft use an engine bleed to provide the pressurized fresh air flow for an aircraft cabin. However, such a system suffers from the disadvantage of requiring a high fuel consumption to provide bleed air relative to the fuel consumption required to generate thrust. The present invention, using a zero bleed, electric powered architecture, does not suffer from this drawback of the conventional ECS.

Figure 1:
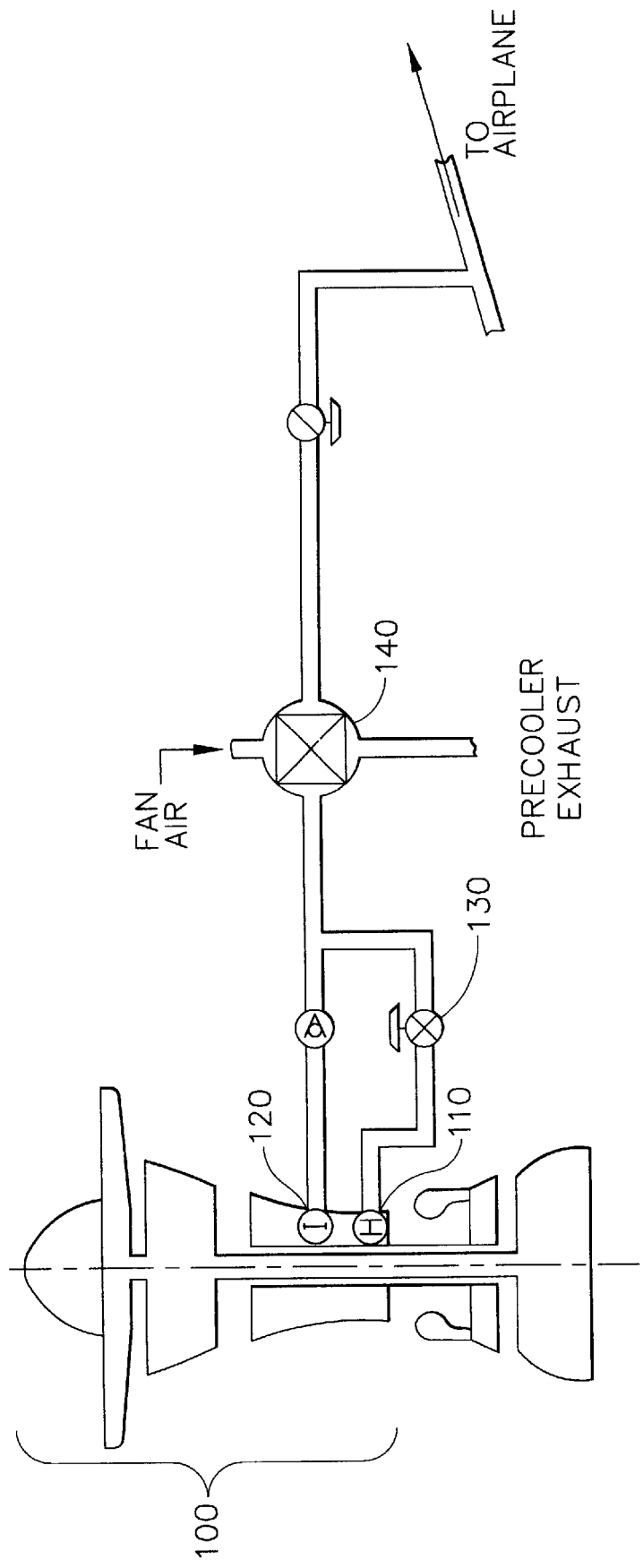
FIG. 1 is a schematic diagram showing a conventional bleed system of a modern commercial jet engine.
Figure 2:
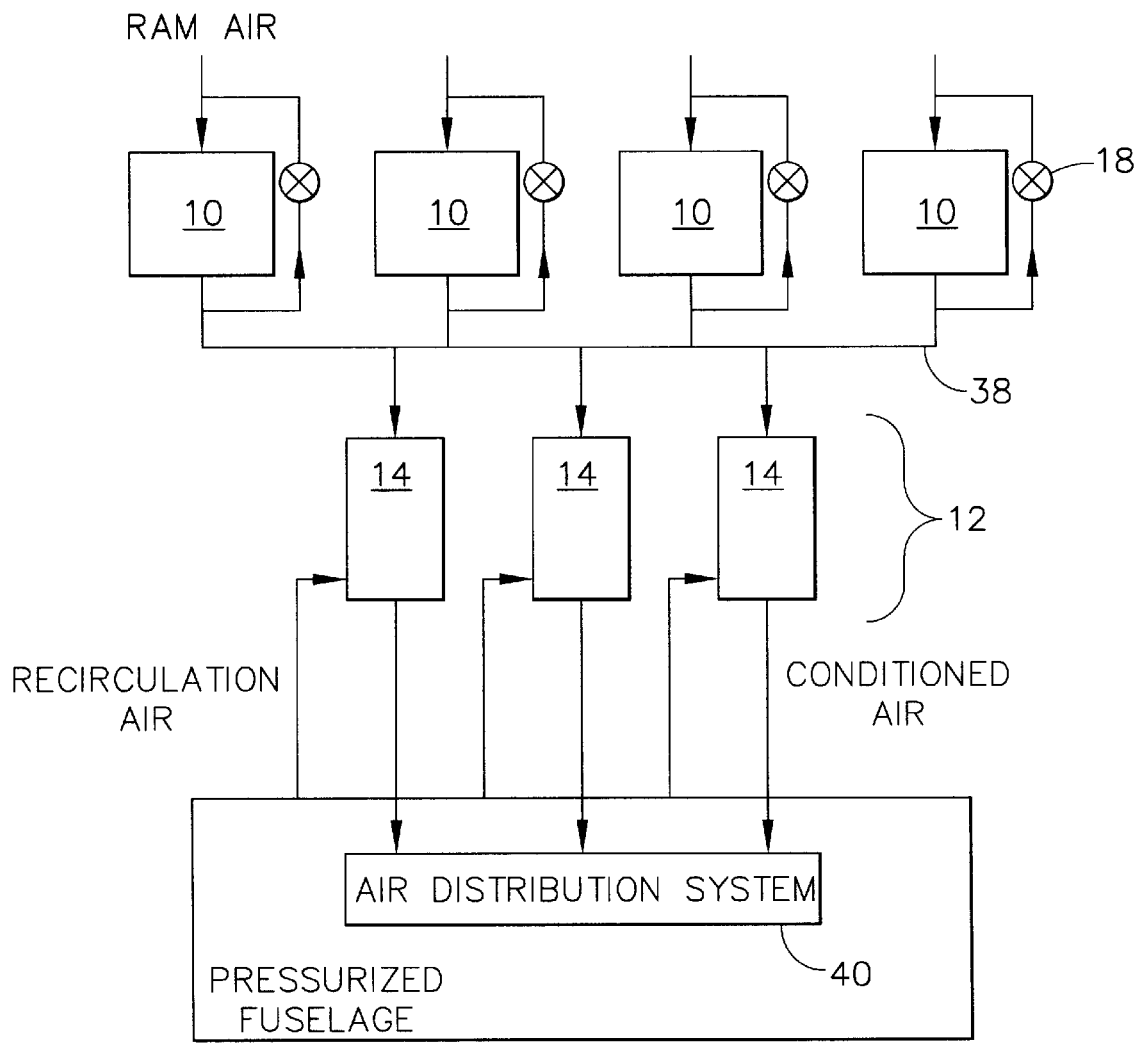
FIG. 2 is a schematic diagram showing the electrical ECS of the present invention.

Referring to FIG. 2, there is shown a schematic overview of the electrical ECS of the present invention. This zero bleed, electric powered architecture may include a plurality of electric motor-driven compressors 10 for cabin pressurization and ventilation, with a vapor cycle system 12 for cooling.

Ram air, that is, fresh air forced in by the movement of the aircraft, may enter each of the plurality of electric motor-driven compressors 10 at arrow R. In one embodiment of the present invention, each compressor 10 may be a single stage centrifugal compressor. To match the operational reliability of the industry standard 777 bleed and air conditioning systems, four cabin air compressors 10 may be used along with two vapor cycle packs 14. The four compressors 10 may be sized to deliver the full fresh air requirement at 45,000 ft. with one compressor out. The 0.4 lb/min per passenger minimum fresh air standard can then be met at 37,000 ft. after a second compressor failure. Vapor cycle packs 14 described below may be configured to allow dispatch with one pack out.

Each compressor 10 may include a recirculation add heat valve 18 to recirculate air at about 160° F. from the compressor impeller back into the compressor feed, mixing with the fresh air. Such a recirculation system is advantageous when the fresh outside air temperature is cold, such at −40° F. The recirculation valve may be adjusted to provide a compressor input air temperature of about 60° F.

After passing through electric motor-driven compressor 10, the air can be collected at a manifold 38 and distributed to vapor cycle packs 14. The conditioned air then passes from vapor cycle system 12 into the air distribution system 40 of the aircraft.

Figure 3:
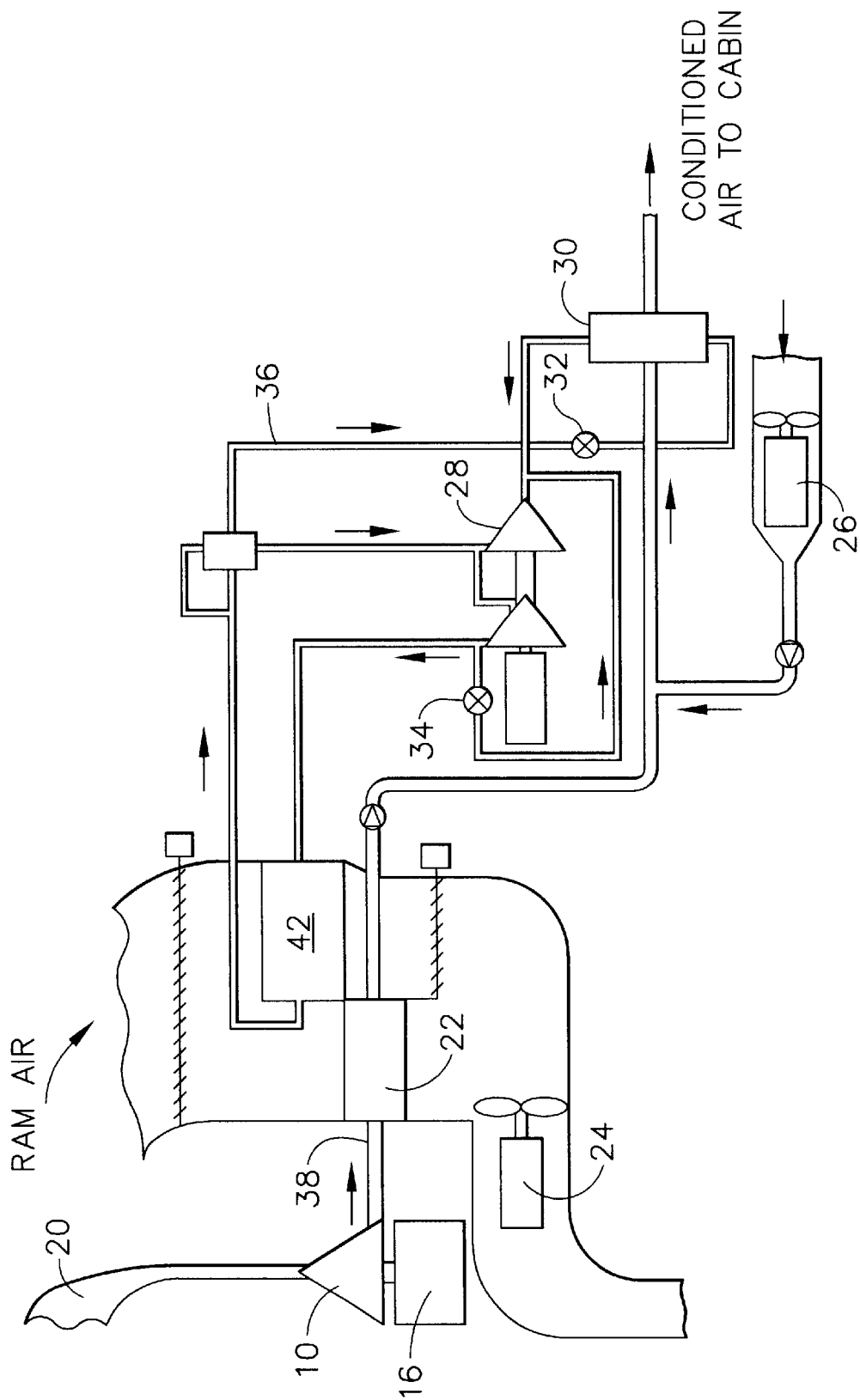
FIG. 3 is a schematic diagram showing the air flow in the electrical ECS of FIG. 2.

Referring now to FIG. 3, there is shown a schematic drawing of the air flow in the electrical ECS of the present invention. Compressor 10 (one shown) may deliver compressed air through manifold 38, then through precooler 22, and into vapor cycle pack 14 (one shown). Each vapor cycle pack 14 can include an evaporator 30, a condenser 42, and refrigerant compressor 28. Air can enter through a body-mounted air inlet 20 and may be compressed to about 5 psi above cabin pressure with cabin air compressor 10 driven by motor 16. The heat of compression may then be sunk to an ambient air cooling stream in precooler 22. The ambient air cooling stream may be provided by either ram air (during flight) or by a ground cooling fan 24, during ground operations.

The fresh air from precooler 22 may then be mixed with recirculation air, typically in equal amounts, from the cabin via cabin air fan 26. The mixed air may then enter a vapor cycle evaporator 30, where it may be chilled to the nominal 40° F. cabin air supply temperature. Moisture from the air is removed as condensation in this process.

Cabin air compressors 10, vapor cycle compressors 14, and ground cooling fan 24 may each be driven by variable-speed electric motors that allow for efficient power management. The motor controllers (not shown) may be about 94 percent efficient, designed to be air cooled, and installed in the pressurized volume.

The fresh air flow rate to the cabin may be controlled by varying the speed of each cabin air compressor 10 in response to feedback from a flow sensor (not shown) at the compressor outlet. The supply temperature to the cabin may be controlled by modulating the speed of a refrigerant compressor 28 in response to the cabin supply temperature. As the speed of the refrigerant compressor 28 increases, the compressor inlet temperature decreases, and correspondingly, the evaporating temperature is reduced, increasing the cooling potential in evaporator 30.

As the evaporator load increases, an expansion valve 32 may open to maintain the refrigerant vapor at a constant temperature of about 5 to 10° F. superheat at the inlet into compressor 28. It is further advantageous to maintain, via expansion valve 32, the refrigerant vapor at a constant 10° F. superheat at the inlet into compressor 28. As the evaporator load decreases, expansion valve 32 may close to prevent the compressor inlet from dropping below 10° F. superheat. As the flow through evaporator 30 continues to be reduced, a compressor surge control bypass valve 34 may be opened to maintain compressor flow sufficient to avoid surge in compressor 28. For long periods of no evaporator cooling, such as cold day ground operation or standard day operation above 30,000 ft., vapor cycle system 12 may be turned off.

A refrigerant loop 36 in the vapor cycle pack 14 may be hermetically sealed to a zero leakage standard using rigid flanges with trapped "O" rings at all duct interfaces. Each joint in the assembled pack may be helium leak checked as part of the acceptance process. The refrigerant may be R-134a, a non-ozone depleting, non-toxic hydrofluorocarbon currently used in automotive air conditioning. An internal pressure sensor (not shown) may be used to monitor the level of the refrigerant charge.

Trim air for zone temperature control may be provided by diverting cabin air compressor discharge air from upstream of precooler 22. Trim air may advantageously be provided from fresh air manifold 38.

EXAMPLES

The system performance of the present invention at the auxiliary power unit (APU) sea level (SL) condition and at a 45,000 ft. Mach 0.8 cruise condition is summarized in Table 1.

TABLE 1

Performance Summary for Electric ECS

| Cabin Air Compressor | Vapor Cycle SL APU Hot day 133 gr/lb* 4 units | Vapor Cycle 45,000 ft Mach 0.8 4 units | Air Cycle SL APU Hot day 133 gr/lb* 2 units |
|---|---|---|---|
| Inlet pressure, psia | 14.7 | 3.04 | 14.7 |
| Inlet temperature (° F.) | 103 | 1.64 | 103 |
| Outlet pressure, psia | 19.7 | 15.18 | 44 |
| Fresh air flow rate/aircraft lb/min. | 292 | 374 | 292 |
| Input power/ aircraft, kW | 93.8 | 295 | 369 |

| Air conditioning (2 units) | Vapor Cycle | Vapor Cycle | Air Cycle |
|---|---|---|---|
| Fresh air flow rate/aircraft lb/min. | 292 | 217 | 292 |
| Recirculation air flow rate/aircraft, lb/min. | 292 | 217 | downstream mixer |
| Total conditioned air flow rate/ aircraft, lb/min. | 584 | 434 | 292 |
| Conditioned air supply temperature, ° F. | 45 | 13 | 16.3 |
| Conditioned air supply humidity, gr/lb* | 42 | 16 | 27 |
| Cabin pressure, psia | 14.7 | 10.9 | 14.7 |
| Compressor input power/ aircraft, kW | 90 | 0 | N/A |
| Ram air fan input power/ aircraft, kW | 90 | 0 | N/A |
| Total electric power load, kW | 273.8 | 295 | 369 |

*gr/lb refers to grams of water per pound of air.

The performance at the APU condition is compared to an alternative electric driven air cycle system. The air cycle system comprises two electric motor driven compressors to supply the pressurized air source in place of the conventional APU bleed source. The size of the primary and secondary heat exchangers is increased by 40% to reduce the required supply pressure at the APU condition to 44 psia and to meet performance at max altitude cruise condition using straight heat exchanger cooling. The cabin air compressors for both the vapor cycle and the air cycle options deliver the same 19.7 psia at the max altitude cruise condition.

The vapor cycle equipment and ram air fan are sized for the 103° F. hot day APU condition. On the ground, the cabin air compressor operates at 40% speed at a 5 psig discharge pressure, which makes up for the pressure drops through the precooler, evaporator, and distribution ducting. The cabin air compressor is sized for the 45,000 ft. hot day cruise, one compressor out condition, where the remaining cabin air compressors operate at 100 percent speed and a 5.0:1 pressure ratio. Only enough compression work is done to meet the flow demand into the cabin at the cabin pressure fixed by the cabin outflow valve.

At the APU design condition, the vapor cycle system uses only 75 percent as much electric power as the air cycle system. In addition, due to the large increase in the required volumetric flow rate at altitude, the 369 kW of compressor power needed for the air cycle must be produced using only two of the four compressors. As a result, two compressors have 184.5 kW drive motors for use on the ground, and two compressors have 75 kW drive motors for use at altitude.

The equipment weights for the vapor cycle system are compared to the air cycle system in Table 2.

TABLE 2

Equipment Weight Summary for the Vapor Cycle and Air Cycle Options

| | Vapor Cycle | | | Air Cycle |
|---|---|---|---|---|
| | Unit Wt.(lb) | Quan./ aircraft | Shipset wt.(lb) | Shipset wt.(lb) |
| Cabin air compressor | 90 | 4 | 360 | 282 + 180 = 462 |
| Motor controller | 75 | 4 | 300 | 310 + 150 = 460 |
| Vapor cycle pack/ ram air fan | 216 | 2 | 432 | |
| Motor controllers | 39 | 4 | 156 | |
| Air cycle packs (2) | | | | 542 |
| Total | | | 1248 | 1464 |

The results of Tables 1 and 2 show that, by using the electrical environmental control system of the present invention, along with a vapor cycle system, the electrical energy consumption and total equipment weight parameters are optimized.

In the embodiment of the present invention described in the drawings, there is shown an ECS using four cabin air compressors 10 and three vapor cycle packs 14. The present invention, however, is not meant to be limited in that manner. Depending upon the aircraft design and requirements, any number of cabin air compressors 10 and vapor cycle packs 14 may be used, so long as the minimum requirements for passenger comfort and safety are meant. Moreover, for use as a cargo aircraft, there may be less stringent temperature and cabin pressure requirements. As such, the system may be designed with the appropriate number of cabin air compressors 10 and vapor cycle packs 14.

The present invention may also include other optional air conditioning devices, such a mechanical and chemical filters and ozone converters. A conventional ozone converter may be included at any location in-line prior to air distribution to the cabin. Such a conventional ozone converter may dissociate ozone to oxygen molecules by catalyzing action of a noble metal catalyst such as palladium. Typical ozone converters are capable of dissociating approximately 95 percent of the ozone entering the converter to oxygen, while having a useful life of about 12,000 flight hours. The ozone converter may be disposed in-line at fresh air manifold 38.

The present invention has been described with reference to providing an ECS for an aircraft. However, the invention is not meant to be limited in such a manner. The ECS of the present invention may be used to provide air conditioning in any enclosed space, especially those spaces wherein persons would be uncomfortable without the air conditioning provided by an ECS.

It should be understood, of course, that the foregoing relates to preferred embodiments of the invention and that modifications may be made without departing from the spirit and scope of the invention as set forth in the following claims.

I claim:

1. An environmental control system for providing conditioned air to a substantially enclosed space, comprising:
   at least one electric air compressor for pressurizing fresh air from outside said space to provide pressurized fresh air, said at least one electric air compressor providing heat to warm said fresh air without the requirement of a resistance heating element;
   at least one vapor cycle pack for conditioning said pressurized fresh air from said at least one air compressor to provide conditioned air;
   an air distribution system for delivering said conditioned air to said space;
   a recirculation add heat valve to recirculate air from an output of said compressor back into an input of said compressor; and
   a precooler for cooling said pressurized fresh air prior to entry into said at least one vapor cycle pack.

2. The environmental control system according to claim 1, further comprising an air fan for recirculating air from said space into said pressurized fresh air prior to passing through said at least one vapor cycle pack.

3. The environmental control system according to claim 1, wherein said substantially enclosed space is a cabin of an aircraft.

4. The environmental control system according to claim 1, wherein said precooler cools said pressurized fresh air through heat exchange with an air flow, said air flow being provided by ram air during a flight mode and said air flow being provided by a ground cooling fan during ground operations.

5. The environmental control system according to claim 1, further comprising an ozone converter for dissociating ozone from said pressurized fresh air into oxygen molecules.

6. The environmental control system according to claim 1, wherein said at least one air compressor and said at least one vapor cycle pack are driven by variable speed electric motors, thereby allowing for efficient power management.

7. The environmental control system according to claim 1, wherein said at least one air compressor includes four cabin air compressors and said at least one vapor cycle pack includes three vapor cycle packs.

8. The environmental control system according to claim 1, further comprising control means for controlling the cooling provided by said at least one vapor cycle pack.

9. The environmental control system according to claim 8, wherein said control means includes an expansion valve for maintaining a refrigerant vapor at about 5 to 10° F., and a compressor surge bypass valve for maintaining a compressor flow sufficient to avoid surge in a compressor of each said at least one vapor cycle pack.

10. An environmental control system for an aircraft to provide a flow of conditioned air within at least a cabin portion of said aircraft, comprising:
    at least one electric cabin air compressor for pressurizing fresh air from outside of said aircraft to provide pressurized fresh air;
    at least one vapor cycle pack for conditioning said pressurized fresh air from said plurality of cabin air compressors to provide conditioned air;
    an air distribution system for delivering said conditioned air to a cabin of said aircraft;
    a recirculation add heat valve to recirculate air from an output of said cabin air compressor back into an input of said cabin air compressor; and
    a precooler for cooling said pressurized fresh air prior to entry into said at least one vapor cycle pack.

11. The environmental control system according to claim 10, further comprising a cabin air fan for recirculating air from said cabin into said pressurized fresh air prior to passing through said at least one vapor cycle pack.

12. The environmental control system according to claim 10, wherein said electric air compressor operates to warm said fresh air, without the requirement of a separate resistance heating element.

13. The environmental control system according to claim 10, wherein said precooler cools said pressurized fresh air through heat exchange with an air flow, said air flow being provided by ram air during a flight mode and said air flow being provided by a ground cooling fan during ground operations.

14. The environmental control system according to claim 10, further comprising an ozone converter for dissociating ozone from said pressurized fresh air into oxygen molecules.

15. The environmental control system according to claim 10, wherein said at least one air compressor and said at least one vapor cycle pack are driven by variable speed electric motors, thereby allowing for efficient power management.

16. The environmental control system according to claim 10, wherein said at least one air compressor includes four cabin air compressors and said at least one vapor cycle pack includes three vapor cycle packs.

17. The environmental control system according to claim 10, further comprising control means for controlling the cooling provided by said at least one vapor cycle pack.

18. The environmental control system according to claim 17, wherein said control means includes an expansion valve for maintaining a refrigerant vapor at about 5 to 10° F., and a compressor surge bypass valve for maintaining a compressor flow sufficient to avoid surge in a compressor of each said at least one vapor cycle pack.

19. A method for supplying conditioned air to at least a cabin area of an aircraft, comprising:
    pressurizing fresh air from outside said aircraft with at least one electric cabin air compressor to provide pressurized fresh air, said at least one electric air compressor providing heat to warm said fresh air without the requirement of a resistance heating element;
    conditioning said pressurized fresh air with at least one vapor cycle pack to provide conditioned air;
    recirculating air from an output of said cabin air compressor back into an input of said cabin air compressor;
    cooling said pressurized fresh air prior to entry into said at least one vapor cycle pack with a precooler; and
    distributing said conditioned air to said cabin area of said aircraft.

20. The method according to claim 19, further comprising recirculating air from said cabin area with an air fan into said pressurized fresh air prior to passing through said at least one vapor cycle pack.

21. The method according to claim 19, further comprising dissociating ozone from said pressurized fresh air into oxygen molecules with an ozone converter.

22. The method according to claim 19, wherein said at least one air compressor and said at least one vapor cycle pack are driven by variable speed electric motors, thereby allowing for efficient power management.

23. The method according to claim 19, further comprising controlling the amount of cooling provided by said at least one vapor cycle pack.

24. The method according to claim 23, wherein said controlling step includes adjusting an expansion valve to maintain a refrigerant vapor at about 5 to 10° F., and a compressor surge bypass valve to maintain a compressor flow sufficient to avoid surge in a compressor of each of said at least one vapor cycle packs.

25. A method for supplying conditioned air to at least a cabin area of an aircraft, comprising:
  pressurizing fresh air from outside said aircraft with at least one electric cabin air compressor to provide pressurized fresh air, said at least one electric air compressor being driven by a variable speed electric motor to provide heat to warm said fresh air without the requirement of a resistance heating element;
  conditioning said pressurized fresh air with at least one vapor cycle pack to provide conditioned air, said vapor cycle pack being driven by a variable speed electric motor;
  dissociating ozone from said pressurized fresh air into oxygen molecules with an ozone converter;
  recirculating air from an output of said compressor back into an input of said compressor;
  recirculating air from said cabin area with an air fan into said pressurized fresh air prior to passing through said at least one vapor cycle pack;
  cooling said pressurized fresh air prior to entry into said at least one vapor cycle pack with a precooler; and
  distributing said conditioned air to said cabin area of said aircraft.

26. The method according to claim 25, further comprising controlling the amount of cooling provided by said at least one vapor cycle pack.

27. The method according to claim 25, wherein said controlling step includes adjusting an expansion valve to maintain a refrigerant vapor at about 5 to 10° F., and a compressor surge bypass valve to maintain a compressor flow sufficient to avoid surge in a compressor of each of said at least one vapor cycle packs.

* * * * *